United States Patent
Blong et al.

(10) Patent No.: US 9,591,075 B2
(45) Date of Patent: Mar. 7, 2017

(54) CLOUD STORAGE FOR MOBILE DEVICES BASED ON USER-SPECIFIED LIMITS FOR DIFFERENT TYPES OF DATA

(71) Applicant: Verizon Patent and Licensing Inc., Arlington, VA (US)

(72) Inventors: Devin Blong, Penngrove, CA (US); Manish Sharma, San Jose, CA (US); Kevin Flores, San Jose, CA (US); Tushar Chaudhary, San Francisco, CA (US); Gaurav Gupta, San Jose, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/584,307

(22) Filed: Dec. 29, 2014

(65) Prior Publication Data
US 2016/0192178 A1    Jun. 30, 2016

(51) Int. Cl.
*H04L 29/08* (2006.01)
*G06F 3/06* (2006.01)
*H04N 21/433* (2011.01)

(52) U.S. Cl.
CPC .......... *H04L 67/1097* (2013.01); *G06F 3/067* (2013.01); *H04N 21/4334* (2013.01)

(58) Field of Classification Search
CPC ...... H04L 67/1097; H04W 8/20; G06F 3/067; G06F 3/0683; G06F 17/302; G06F 3/0617; G06F 3/0604; G06F 3/0647; G06F 3/0685; G06F 17/30082; G06F 17/30221; G06F 2009/45583; G06F 21/6218; G06F 3/0644; G06F 17/3056; G06F 3/0608; G06F 3/0653

See application file for complete search history.

(56) References Cited

U.S. PATENT DOCUMENTS

| | | | |
|---|---|---|---|
| 2011/0293251 A1* | 12/2011 | Roberts | H04N 21/23103 386/295 |
| 2013/0227082 A1* | 8/2013 | Lin | H04L 67/06 709/219 |
| 2014/0036666 A1* | 2/2014 | Sanda | H04W 28/18 370/230 |
| 2015/0365491 A1* | 12/2015 | Chan | H04L 67/06 709/219 |
| 2015/0373116 A1* | 12/2015 | Mo | G06F 3/0608 709/219 |

* cited by examiner

*Primary Examiner* — Magdi Elhag

(57) ABSTRACT

Techniques described herein may enable users to manage the division of storage, for multiple applications and on a per-content type basis, between cloud storage and local storage. A mobile device may receive user preference information relating to storage limits, each of the storage limits being applicable to an aggregate amount of data, of a particular content type, and associated with a number of applications executed by the mobile device. The mobile device transfer data, to and from cloud storage, to enforce the storage limits included in the user preference information.

20 Claims, 11 Drawing Sheets

500

| Content Type | Local Storage | Cloud Storage | Maximum Storage |
|---|---|---|---|
| Audio | 50% | 50% | 2000 MB |
| Photos | 500 MB | 3000 MB | 3500 MB |
| App Data | 300 MB | -- | unlimited |
| Books | -- | 300 MB | 10,000 MB |
| Documents | 60% | 40% | 1000 MB |
| Other | 25% | 75% | 2000 MB |

Fig. 5

CLOUD STORAGE FOR MOBILE DEVICES BASED ON USER-SPECIFIED LIMITS FOR DIFFERENT TYPES OF DATA

BACKGROUND

Mobile devices, such as smart phones, are increasingly used as general computing devices that are used to execute a wide variety of applications, such as photo management applications, video playback applications, word processing applications, etc. Such applications may create and/or use large amounts of data. Mobile devices may store the data locally (e.g., on a Secure Digital (SD) card). Additionally, remote storage services ("cloud storage" services) may store data at remote servers.

Cloud storage services may be used to expand the storage capacity of a mobile device and/or provide easier access to the user's data from multiple different computing devices. Cloud storage services may, however, introduce delay when accessing data and may be dependent on a network connection to be useful. Additionally, for smart phones, cloud storage services are typically implemented on a per-application basis, such that a particular application either uses cloud storage services or does not use cloud storage services.

BRIEF DESCRIPTION OF THE DRAWINGS

FIG. 5 illustrates an example data structure relating to the storage of data on a per-data type basis;

DETAILED DESCRIPTION OF PREFERRED EMBODIMENTS

The following detailed description refers to the accompanying drawings. The same reference numbers in different drawings may identify the same or similar elements.

Techniques described herein may enable users to manage the division of storage, associated with the users, between cloud storage and local storage. A user may configure the storage on a per-content type basis. For example, a certain amount of local storage may be allocated for photos, a different amount of local storage may be allocated for music, a different amount of local storage may be allocated for user documents, etc. In this manner, a user may be provided with fine-grain control of where and how the user's data is stored. The storage allocations may be performed through an operating system (OS) layer or other system layer of the mobile device. The user may not need to configure the storage allocations for particular applications.

Figure 1:
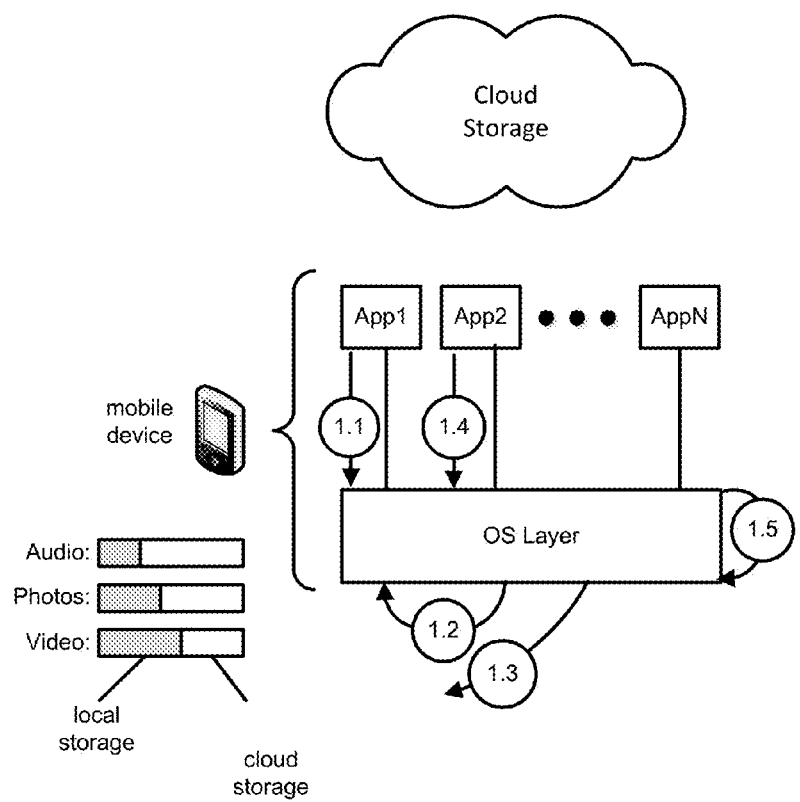
FIG. 1 is a diagram illustrating an example of an overview of concepts described herein.

FIG. 1 is a diagram illustrating an example of an overview of concepts described herein. As illustrated, a mobile device, such as a smart phone, may connect to cloud storage services ("Cloud Storage") through a network (not shown). The mobile device may execute a number of application level programs ("apps"), illustrated as "App", "App", . . . "AppN", which may interact with an OS layer of the mobile device. The mobile device may include local storage (not shown), such as a disk drive, secure digital (SD) card, or other non-volatile type of local storage.

The mobile device may provide an interface, such as a graphical interface, through which a user can adjust amounts of local and cloud storage for different types of content. For example, as illustrated, a graphical slider or other widget may be used to indicate how much local storage or cloud storage should be used for audio content, photo content, and video content. The graphical slider may be used to adjust the storage on a percentage basis (e.g., a certain percent of all audio content should be stored locally or a certain percent or all local storage should be dedicated to audio content, etc.) or an absolute basis (e.g., the user may designate that a certain amount of local storage is used for audio content and, when the amount of audio data is over the certain amount, cloud storage may be used).

As an example of the operation of the mobile device, an application, such as App1, may request storage of a photo (at 1.1, "request storage of a photo"). The request may be pursuant to an interface provided by the OS layer. For example, developers, such as the developers of App1 and App2, may use a software development kit (SDK) to make storage (and read and write access) requests to the OS layer of the mobile device. The OS layer may receive the request and may store the photo in local storage or cloud storage (at 1.2, "OS layer determines where to store the requested data (based on user preferences and based on an amount of photo content stored by other apps)"). The determination of where to store the photo content may be based on photo content that was previously stored by App1, App2, . . . AppN, and based on the user inputted relative storage amounts. In this example, assume that the photo is stored locally. From the perspective of App1, the storage location of the photo (determined by the OS layer) may be unknown and/or may not be important for the operation of App1.

The mobile device may occasionally or intermittently optimize the apportionment of different types of data between local and cloud storage. For example, older photo content (e.g., photos that have not been recently viewed) may be moved to cloud storage and photo content that has been more recently accessed may be moved to local storage. As another example, data storage requests may initially always be written to local storage, and the mobile device may, in the background with respect to the user, occasionally move some of the locally stored data to cloud storage.

At some point, assume that a second application, App2, also request storage of a photo (at 1.4, "request storage of a photo"). The OS layer may receive the request and may store the photo data in local storage or cloud storage (at 1.5, "OS layer determines where to store the requested data (based on user preferences and based on an amount of photo content stored by other apps)"). The determination of where to store the photo content may be based on the total amount of stored photo content, including the photo content that was previously stored by other applications, such as App1.

Figure 2:
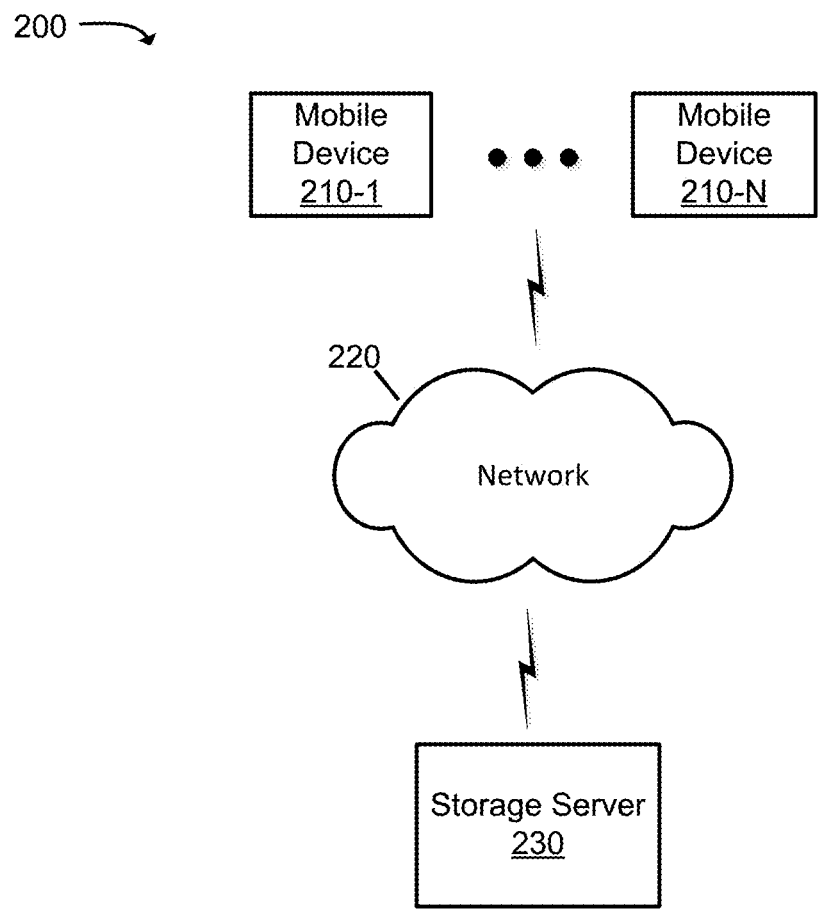
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more mobile devices 210-1 through 210-N (where N is an integer greater than or equal to one, hereinafter sometimes referred to individually as "mobile device 210" and collectively as "mobile devices 210"), network 220, and storage server 230.

Mobile device 210 may include a portable computing and communication device, such as a personal digital assistant (PDA), a smart phone, a cellular phone, a laptop computer with connectivity to a cellular wireless network, a tablet computer, etc. Mobile device 210 may also include non-portable computing devices, such as desktop computers, consumer or business appliances, or other devices that have the ability to connect to network 220.

Network 220 may represent a wireless network (e.g., a wireless cellular network), and/or a wired network, through which mobile devices 210 and storage server 230 may communicate. Network 220 may include a wide area network ("WAN"), a metropolitan area network ("MAN"), the Internet, a fiber optic-based network, and/or a combination of these or other types of networks. In one implementation, network 220 may include a wireless network that is implemented based on the Long Term Evolution ("LTE") standard. In other implementations, network 220 may include a wireless network implemented based on other standards, such as a Code Division Multiple Access ("CDMA") 2000 1X network, a second generation ("2G") wireless network, a third generation ("3G") wireless network, a fifth generation ("5G") wireless network, a "Wi-Fi" wireless network (e.g., a network that operates according to an Institute of Electrical and Electronics Engineers ("IEEE") 802.11 standard), and/or another wireless network. In some implementations, network 220 may be communicatively coupled to one or more other networks.

Storage server 230 may include one or more computing devices, potentially geographically distributed, that provide remote storage services ("cloud storage") to mobile devices 210. Storage server 230 may, for example, receive requests, from mobile devices 210, to store data and to retrieve data. The requests may include or be associated with the data that is to be stored or retrieved. Storage server 230 may additionally provide for authentication and authorization, of mobile devices 210, before providing storage services to mobile devices 210. In one implementation, storage server 230 may be designed to be provided as a service to an OS layer of mobile devices 210. That is, users of mobile devices 210 may not need to configure or be aware of the operation of storage server 230. For example, storage server 230 may be provided by an operator of a wireless network (e.g., a cellular network provider that operates network 220) that provides network connectivity to mobile devices 210.

In some implementations, storage server 230 may be provided by one or more third-party providers (e.g., by one or more entities other than an operator of network 220). In this case, mobile devices 210 may include software tools for managing the storage servers provided by the third-party providers. For example, the software tools may automatically select the most cost-effective storage service provided by the third-party providers, allow the user the select different storage providers based on content type (e.g., photos may be stored to a first storage provider, audio to a second storage provider, etc.), and/or provide other tools for integrating with and managing the potential different storage servers.

Figure 3:
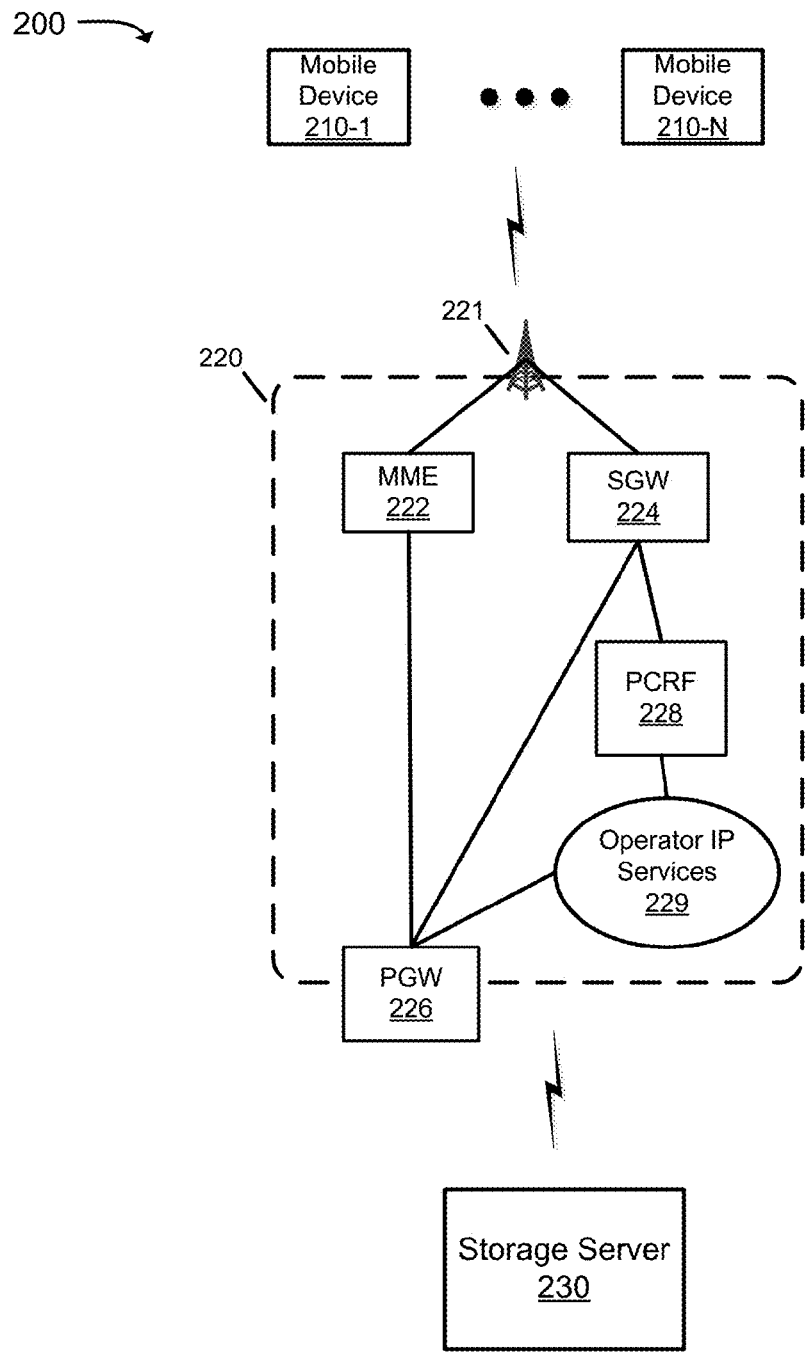
FIG. 3 is a diagram of environment in an implementation that includes a Long Term Evolution (LTE)-based wireless cellular network.

FIG. 3 is a diagram of environment 200, in an implementation in which network 220 includes a LTE-based wireless cellular network. Wireless network 220 may generally include an access network, such as a 3rd Generation Partnership Project (3GPP) LTE access network, and a core network. The access network may include base station 221. The core network may include mobility management entity (MME) 222, serving gateway (SGW) 224, packet data network gateway (PGW) 226, policy charging and rules function (PCRF) 228, and operator IP services 229. In some implementations, various ones of the elements illustrated in the core network, such as MME 222 and SGW 224, may alternatively be implemented as part of or be considered to be part of the access network. In one implementation, the core network may include an Internet Protocol (IP)-based network, such as System Architecture Evolution (SAE) core network or a General Packet Radio Service (GPRS) core network.

Base station 221 may provide a radio interface over which the base station may communicate with mobile devices 210. The radio interface may include a radio interface that implements, for example, an Evolved Terrestrial Radio Access Network (E-UTRAN). In the context of an LTE-based access network, base stations 221 may be referred to as evolved NodeBs (eNodeBs).

MME 222 may include one or more computation and communication devices that perform operations to register mobile devices 210, establish bearer channels associated with sessions with mobile devices 210, hand off mobile devices 210 from one base station to another, implement network traffic policies, and/or perform other operations. MME 222 may generally handle control plane traffic. SGW 224 may include one or more network devices that aggregate traffic received from one or more base stations 221. SGW 224 may generally handle user (data) plane traffic.

PGW 226 may include one or more devices that act as the point of interconnect between the core network and an external network and/or operator IP services 229. PGW 226 may route packets to and from the access network and external networks or devices. PCRF 228 may operate in real-time to determine policy rules for the network. PCRF 228 may aggregate information to and from the core network, operational support systems, and other sources. PCRF 228 may support the creation of rules and policy decisions for active subscribers. The rules and policy decisions may include communication restriction policies that relate to restricting certain communications.

Operator IP services 229 may represent one or more services that are offered by the operator of network 220. The services may include IP multimedia (IMS)-based services, transparent end-to-end packet-switched streaming services (PSSs), or other services.

The quantity of devices and/or networks, illustrated in FIGS. 2 and 3, is provided for explanatory purposes only. In practice, there may be additional devices and/or networks; fewer devices and/or networks; different devices and/or networks; or differently arranged devices and/or networks than illustrated in FIGS. 2 and 3. Alternatively, or additionally, one or more of the devices of environment 200 may perform one or more functions described as being performed by another one or more of the devices of environment 200.

Figure 4:
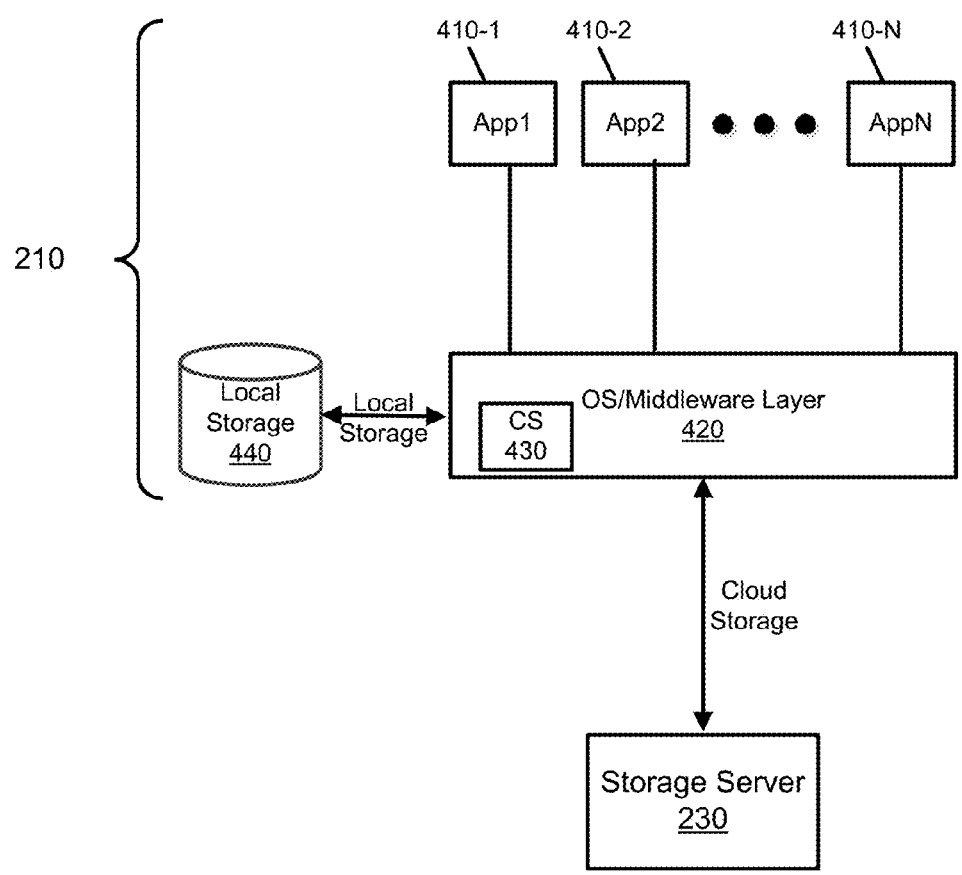
FIG. 4 is a diagram illustrating example functional components of a mobile device, in accordance with some implementations.

FIG. 4 is a diagram illustrating example functional components of mobile device 210, in accordance with some implementations. As shown, mobile device 210 may include a number of applications, labeled as App1 410-1, App2 410-2, through AppN 410-N, OS/middleware layer 420, cloud storage (CS) component 430, and local storage 440.

Applications 410-1 through 410-N may include applications such as, for example, photo management applications, video playback or authoring applications, audio playback or authoring applications, word processing applications, etc. OS/middleware layer 420 may include software, associated with mobile device 210, that manages the hardware and software resources, of mobile device 210, and may provide for common services for applications 410. Consistent with aspects described herein, one of the common services provided by OS/middleware layer 420 may include services relating to the automatic management of data storage between local storage 440 and cloud storage (e.g., storage using storage server 230). CS component 430 may represent the functionality, of OS/middleware layer 420, associated with these services. Examples of the operation of CS component 430 will be described in more detail below.

Local storage 440 may include a disk drive, SD card, or other non-volatile type of local storage via which user data may be stored. As previously mentioned, different applications, such as applications 410, may generate or use different types of content. As a non-limiting example of the types of content, the types of content may include: audio content (e.g., Moving Picture Experts Group (MPEG)-2 Audio Layer 3 ("mp3") files, MPEG-4 Audio Lossless Coding (MPEG-4 ALS) files, etc.), photo content (e.g., image files), application content (e.g., state data and/or configuration data stored by particular applications 410), book content, document content (e.g., word processing documents, spreadsheet documents, user database data, presentation documents, etc.), or other types of content.

FIG. 5 illustrates an example data structure 500 relating to the storage of data on a per-content type basis. Data structure 500 may be maintained, for example, by mobile device 210, such as by CS component 430. In general, data structure 500 may be used to store information indicating absolute or relative allotments of data storage between local storage and cloud storage. Data allotments may, in some implementations, be stored on a per-content type basis.

As illustrated, data structure 500 may include a number of fields, including: content type field 510, local storage field 520, cloud storage field 530, and maximum storage field 540. The fields shown for data structure 200 are examples. In alternative possible implementations, different, fewer, or additional fields may be implemented.

Content type field 510 may store an indication of the type of content corresponding to a particular record in data structure 500. Local storage field 520 and cloud storage field 530 may store indications of absolute or relative allotments relating to amounts of content that should be stored locally and via cloud storage. Maximum storage field 540 may indicate a maximum amount of data that should be stored for particular content type.

In one implementation, fields 520-540 may be based on a percentage allocation. For example, as shown in data structure 500, for the content type "audio," 2000 megabytes (MBs) may be used to store audio data content (field 540). Of the 2000 MB, half may be allocated for local storage (50%, field 520) and half may be allocated for cloud storage (50%, field 530). Thus, in this example, CS component 430 may store audio data to local cloud storage based on the restriction that a maximum of 2000 MBs of audio data is stored and that up to 1000 MB of audio data is stored via local storage and via cloud storage.

As another example of data allotments between local and cloud storage, as shown in data structure 500, for the content type "photos," 3500 MB used to store photo content (field 540). Of the 3500 MB, 500 MB may be allocated for local storage (field 520) and 3000 MB may be allocated for cloud storage (field 530). As another example, for the content type "app data," 300 MB may be allocated for local storage (field 520) and the maximum storage amount may be unlimited (field 540). In this example, local storage may be preferentially used to store app data, up to a maximum of 300 MB of data. Cloud storage may be used to store additional data of the content type "app data." Similarly, for the content type "books," 300 MB may be allocated for cloud storage (field 530) and the maximum storage amount may be 10,000 MB (field 540). In this example, cloud storage may be preferentially used to store book content, up to a maximum of 300 MB of data. Local storage may be used to store additional content of the type "books."

Figure 6:
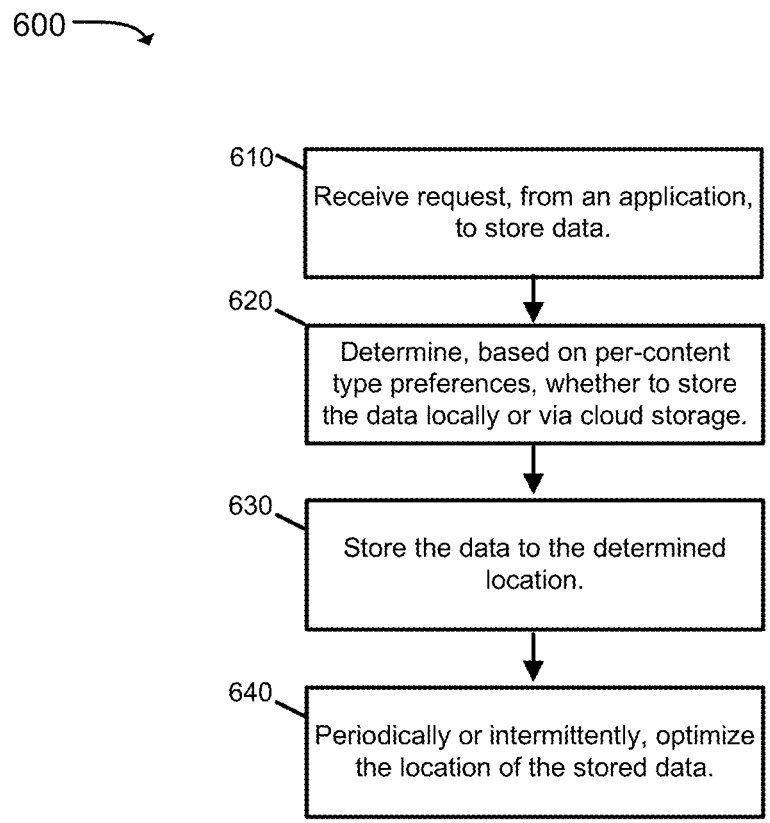
FIG. 6 is a flowchart illustrating an example of a process relating to cloud storage for mobile devices based on user specified limits.

FIG. 6 is a flowchart illustrating an example of a process 600 relating to cloud storage for mobile devices based on user specified limits. Process 600 may be performed by, for example, mobile device 210 (e.g., by CS component 430 of mobile device 210).

Process 600 may include receiving a request, from an application, to store data (block 610). One of applications 410 may have data (i.e., a content item), of a particular content type, to store. For example, a camera application may capture a photo and request to store the photo. The camera application may issue the request to OS/middleware layer 420 (e.g., to CS component 430). In one implementation, requests to store data using the cloud storage services described herein may be made using non-standard storage requests. For example, CS component 430 may be associated with a SDK that may be used, by developers of applications 410. The SDK may enable the developers to use the non-standard storage requests that are issued to CS component 430.

In one implementation, storage requests, from application 410, may include, in addition to the substantive data that is to be stored (or a link to the substantive data that is to be stored), an explicit indication of the content type relating to the storage request. For example, the storage request may include a label indicating, from a number of possible content types (e.g., audio, photos, etc.) the particular content type associated with the request. Alternatively or additionally, CS component 430 may automatically determine the content type based on analysis of the substantive data associated with the request. For example, certain content types may be associated with particular structures or bit sequences that may indicate the data type (e.g., an image may always begin with a particular sequence). Alternatively or additionally, CS component 430 may automatically determine the content type based on the application that issued the storage request. For example, certain applications, such as a camera application, may only store certain content types (e.g., photos).

Process 600 may further include determining, based on per-content type preferences, whether to store the data locally or via cloud storage (block 620). The user preferences may be input, by the user, via a graphical interface, such as an interface associated with a "settings" menu of the operating system. The user preferences may be stored in a data structure, such as data structure 500.

In one implementation, the determination may be based on preferentially storing data to local storage and using cloud storage when the local storage is full. Alternatively, the determination may be based on preferentially storing data to cloud storage and using local storage when the local storage is full. In some implementations, additional factors, such as the expected likelihood that the data will be later requested may be used in making the determination as to where to store the data. For example, some applications may tend to store a large amount of data but never or rarely read the stored data. Data storage requests for these applications may be preferentially stored to cloud storage. Other applications may be more likely to read data that was recently stored. Data storage requests for these applications may be preferentially stored to local storage. In one implementation, CS component 430 may analyze storage and read requests, received from various applications 410, to determine whether particular applications are likely to issue read requests for previously stored data. A non-limiting list of factors that may be used to make the determination of whether to store the data locally or via cloud storage may include: (1) content file size, (2) overall storage space of mobile device 210, (3) time/date of content creation, (3) last access time/date, (4) last access of content of a particular type, (5) last access time/date by the application that created a content file, (6) last access time/date by any applications that use content of the particular type, and/or (7) known upcoming user events. It can be appreciated that other techniques may be used to determine whether to store data locally or via cloud storage.

In one implementation, in response to a storage request, CS component 430 may determine whether storing the requested data locally would put the local storage total, for the content type associated with the request, over the user specified limit. If so, CS component 430 may select data (not necessarily the data associated with the request) to move to cloud storage (i.e., to store via cloud storage and delete locally). The selection of the data may be based on a determination of which content, of the particular content type, is least likely to be subsequently read and/or is least relevant to the user.

Process 600 may further include storing the data to the determined location (block 630). Based on the determination made in block 620, OS/middleware layer 420 may store the data to local storage 440 or to cloud storage (e.g., storage server 230). CS component 430 may keep track of the amount of data, for each content type, stored for all applications 410. In one possible implementation, CS component 430 may always initially store the data locally and, when the data is to be stored to cloud storage, schedule the uploading or otherwise perform the uploading to cloud storage at a later time (e.g., during a period of low network load).

Process 600 may further include periodically or intermittently optimizing the location of the stored data (block 640). The optimization may be made with the general goal of maintaining the user experience, when using applications 410, at a high level. For example, in one implementation, CS component 430 may keep track of the last read or modified time of files. CS component 430 may move files between local storage and cloud storage so that older files (files that were not recently read or modified) tend to be stored in cloud storage. Alternatively or additionally, CS component 430 may take into account the size of files when optimizing the location of the stored data. For example, CS component 430 may optimize the location of the stored data so that large files tend to be stored locally (or vice versa). Alternatively or additionally, CS component 430 may take into account the particular application 410 that is associated with a particular data file. For instance, data that is associated with an application that is rarely used, or that rarely performs read operations of the data, may be preferentially moved to cloud storage as part of the optimization process. The optimization of the location of the stored data may be performed transparently to the operation of the user or of applications 410.

In one implementation, a copy of all the user data may be stored in cloud storage. In this implementation, CS component 430 may effectively operate to determine what user data should also be maintained locally and what user data is to be stored only in cloud storage. The determination of which user content to store locally may be based on the user preferences that are specified on a per-content type basis.

In some implementations, transferring the user data to cloud storage, to optimize the location of the stored data, may be performed based on network conditions. For example, CS component 430 may move data to cloud storage during periods of low network activity, such as during off-peak hours or during periods of low network congestion in which the indication of low network congestion is explicitly indicated via a message received from the network. In the context of network 220, in which network 220 is an LTE network, the indication of low network congestion may include, for example, an indication from base station 221 that the radio interface between base station 221 and mobile device 220 is in a low congestion or not congested state.

Figure 7:
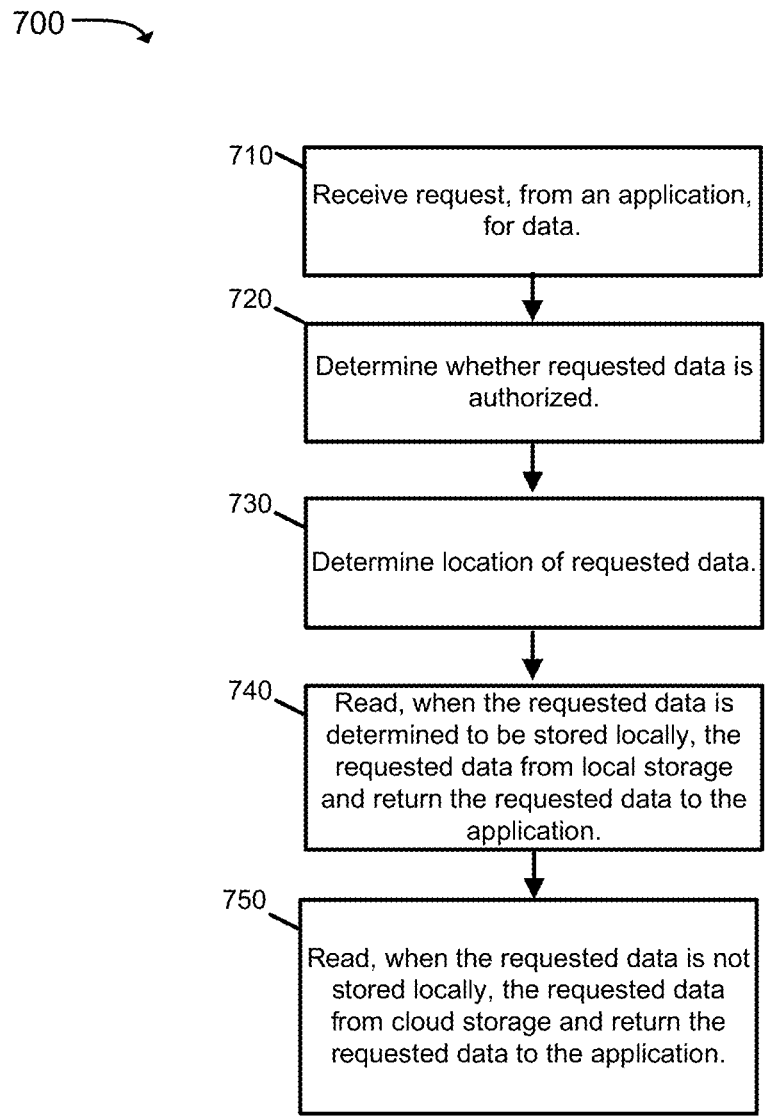
FIG. 7 is a flowchart illustrating an example of a process relating to the reading of data for mobile devices that use cloud storage.

FIG. 7 is a flowchart illustrating an example of a process 700 relating to the reading of data for mobile devices that use cloud storage. Process 700 may be performed by, for example, by mobile device 210 (e.g., by CS component 430 of mobile device 210).

Process 700 may include receiving a request, from an application, for data (block 710). The request may include a link or other identifier of a particular file, or portion of a file, that is requested by application 410. A determination may be made as to whether the requested data is authorized for the requesting application (block 720). In some implementations, data may only be available to the application that was associated with the storage of the data. In these situations, requests for data may only be authorized when the application requesting the data is the same application that stored data. In other implementations, certain data, such as data of certain content types, may be designated as "public" or may be designated as being readable by multiple different applications.

Process 700 further include determining the location of the requested data (block 730). For example, CS component 430 may maintain a table or other data structure indicating, for each content file, the type of the corresponding content, and indication(s) of the storage location(s) of the content files. CS component 430 may thus be able to determine the storage locations of a requested file.

Process 700 may further include reading, when the requested data is determined to be stored locally, the requested data from local storage and returning the requested data to the application (block 740). In this implementation, local data storage may be preferentially read from and used to respond to application data requests. Process 700 may further include, reading, when the requested data is not stored locally, the requested data from cloud storage and returning the requested data to the application (block 750).

Figure 8:
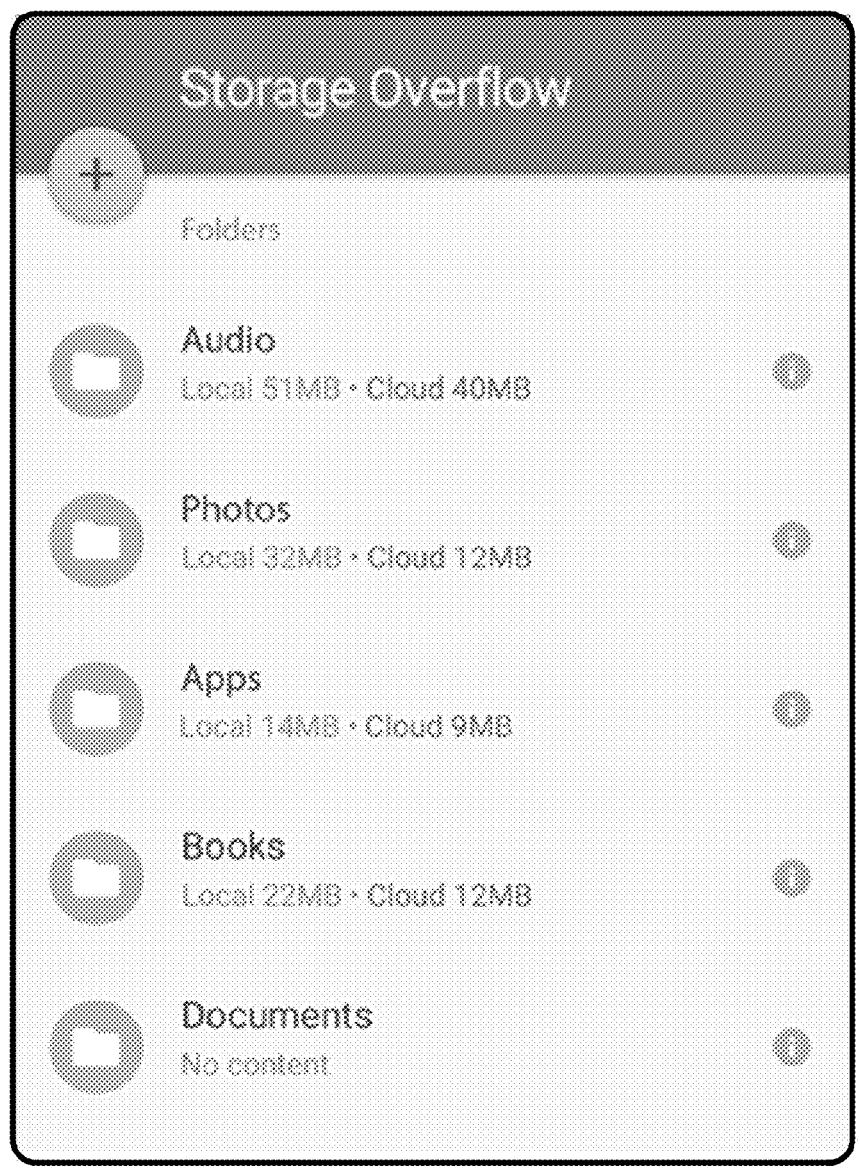
FIGS. 8-10 are diagrams illustrating examples of graphical user interfaces that may be provided by mobile devices.
Figure 9:
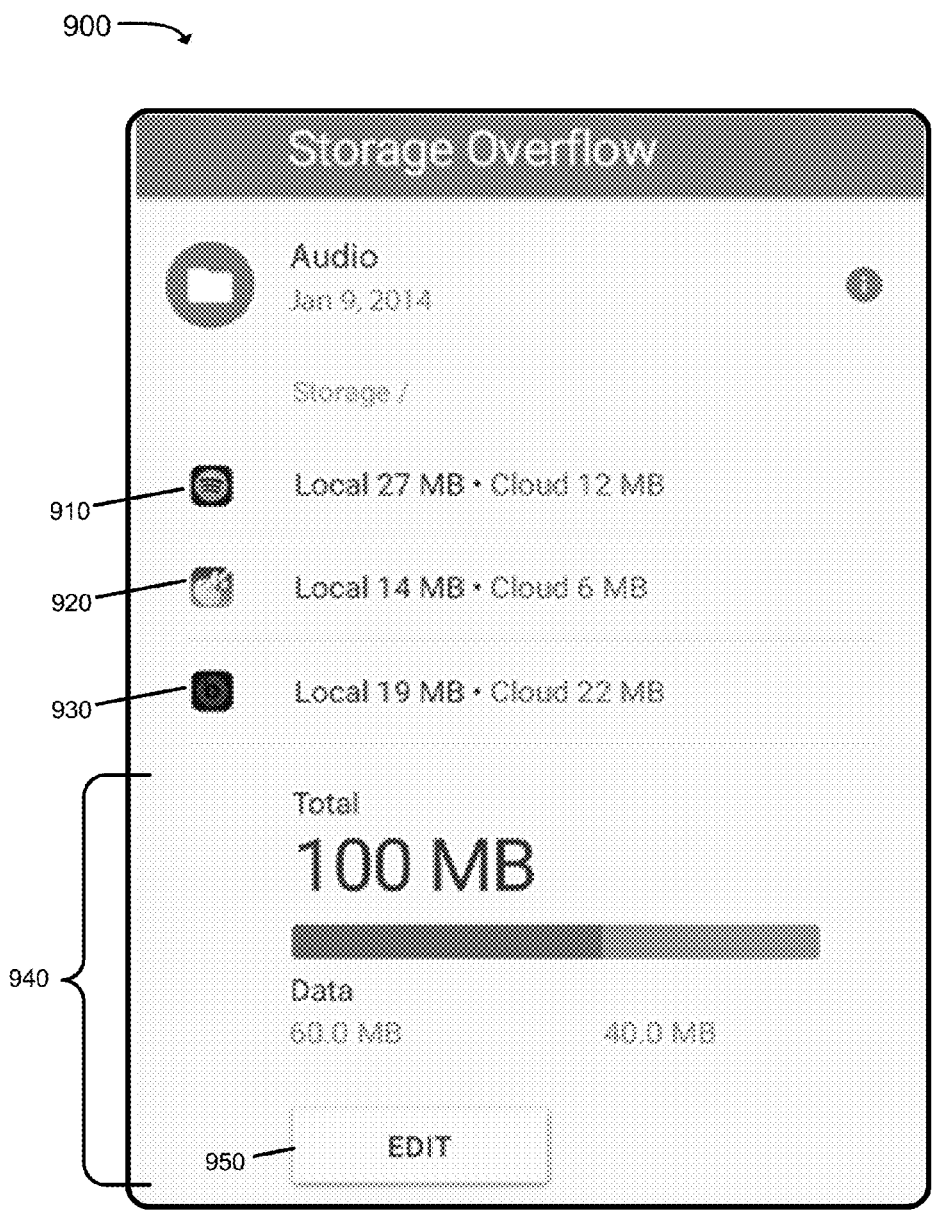
Figure 10:
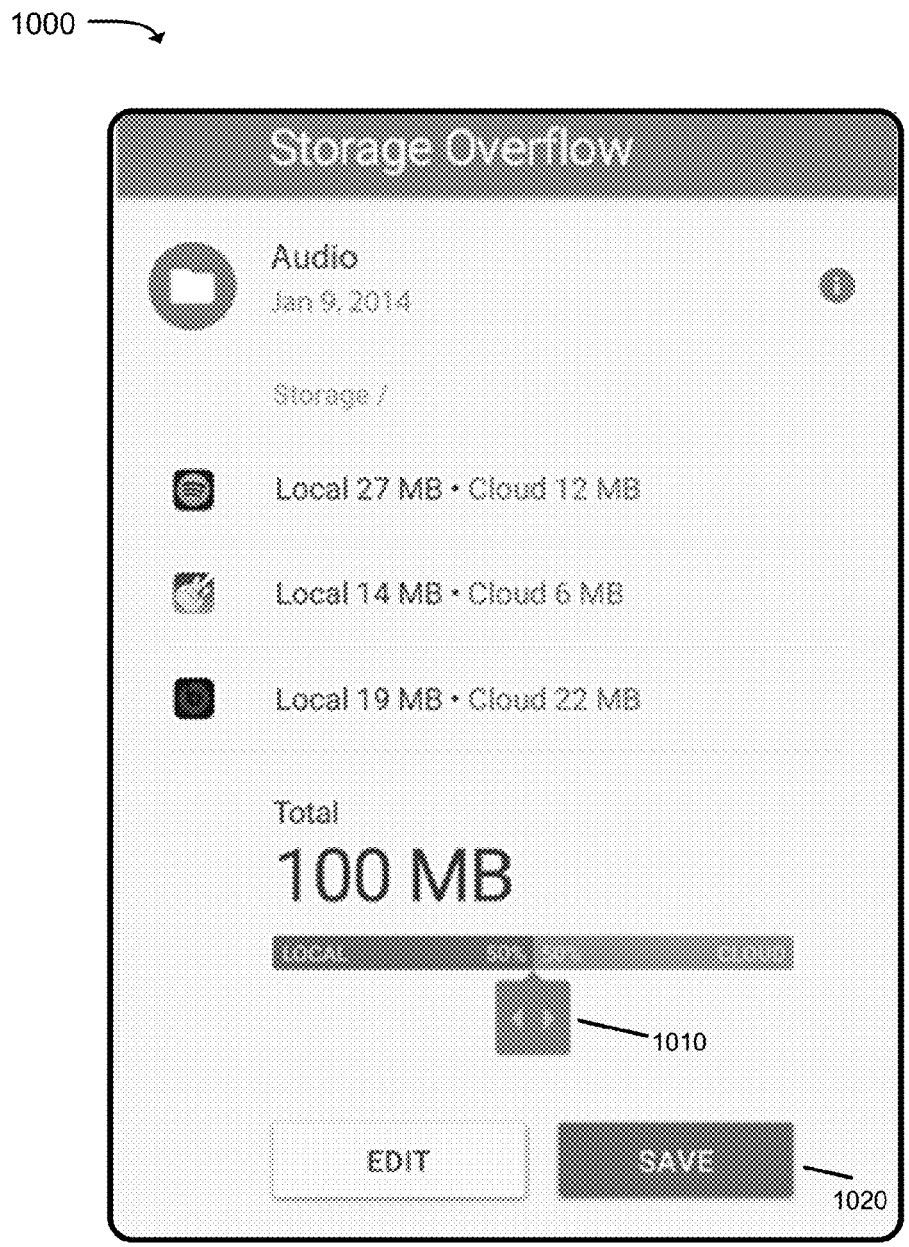

FIGS. 8-10 are diagrams illustrating examples of graphical user interfaces that may be provided by mobile devices 210. The user interfaces shown in FIGS. 8-10 may be provided to users of mobile devices 210 in order to obtain user preference information and provide information relating to cloud storage for the mobile devices.

User interface 800, as shown in FIG. 8, may provide information relating to the per-content type storage that is being used by mobile device 210. For example, as illustrated, user interface 800 may include an indication, for each of the possible content types, of the current storage amounts corresponding to local storage and cloud storage. As shown, in this example, five content types are illustrated: "Audio," "Photos," "Apps," "Books," and "Documents." In this example, content corresponding to the Audio data type may include 51 MB of local storage and 40 MB of cloud storage. Similarly, content corresponding to the Photos data type include 32 MB of local storage and 40 MB of cloud storage; content corresponding to the Apps data type include 14 MB of local storage and 9 MB of cloud storage; content corresponding to the Books data type include 22 MB of local storage and 12 MB of cloud storage; and content corresponding to the documents data type may be empty (e.g., there have been no saved documents).

Users may select, through user interface 800, such as via a graphical touch selection, one of the displayed content types to obtain additional information and/or enter user preference information, relating to the selected content type. FIG. 9 illustrates user interface 900, which may correspond to a version of user interface 800 after the user has selected the Audio data type. As shown, user interface 900 may include a listing of storage amounts, corresponding to the Audio data type, corresponding to different applications that are associated with stored audio content. As illustrated, in this example, a first application 910 may be associated with 27 MB of local storage and 12 MB of cloud storage; a second application 920 may be associated with 14 MB of local storage and 6 MB of cloud storage; and a third application 930 may be associated with 19 MB of local storage and 22 MB of cloud storage. An additional graphical interface section, section 940, may provide information relating to the total amount of stored Audio content. Section 940 may additional include an Edit button 950, which, when selected, may provide the user with an interface via which the user can change the relative allocation of local storage and cloud storage.

FIG. 10 illustrates user interface 1000, which may correspond to a version of user interface 900 after the user has selected Edit button 950. Selecting Edit button 1000 may cause the providing of a graphical widget, such as a slider widget, through which the user can edit the relative allocations of local and cloud storage. In this example, assume that via slider widget 1010, the user has changed the relative allocations to 50% cloud storage and 50% local storage. The user may select Save button 1020 to indicate that the updated storage preference information should be saved. In response, CS component 430, may move audio data between local storage and cloud storage, in the manner previously discussed, to reallocate the local and cloud storage proportions to approximately 50% each.

In some implementations, additional functionality may be provided through user interfaces 800, 900, and 1000. For example, in user interfaces 900 and 1000, selecting a particular application (e.g., 910, 920, and 930) may result in a list of all the content files, of the particular content type, that are associated with the particular application. The user may be able to select a particular content file to manually control whether the content file is stored locally and/or in cloud storage.

As one example of a use case associated with the concepts described above, consider a user that is approaching the local storage capacity limit set for photos. As the user continues to take pictures, such as via a default camera application or a third-party image capture application, CS component 430 may upload the older photos to cloud storage. When viewing "thumbnail" previews of the users' captured photos, all of the preview photos may be displayed to the user. Selecting a particular preview photo, that corresponds to a photo stored in cloud storage, may result in an immediate request, to the cloud storage service, to download the selected photo. From the user's perspective, storage to the cloud storage service may be transparent. In one implementation, and in situations in which the network service provider may generally charge for wireless data transfer via a metered data plan, communications with the cloud storage service may be exempted from the metered data.

Figure 11:
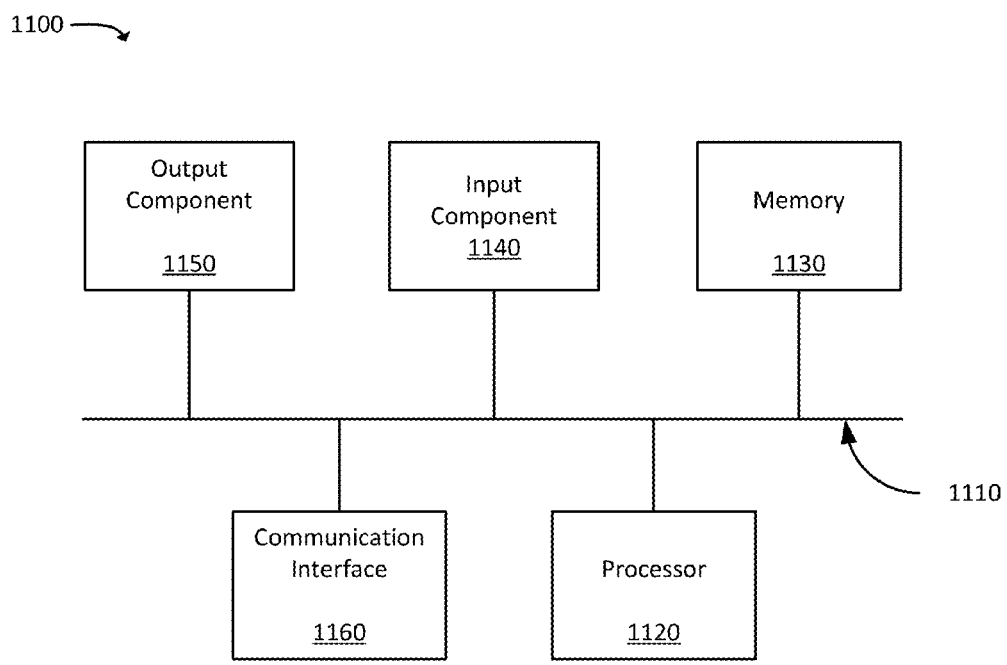
FIG. 11 is a diagram of example components of a device.

FIG. 11 is a diagram of example components of device 1100. One or more of the devices described above (e.g., with respect to the devices illustrated in FIGS. 1-4) may include one or more devices 1100. Device 1100 may include bus 1110, processor 1120, memory 1120, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1120 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations by processing circuitry, such as processing circuitry that operates in response to processor 1120 executing software instructions stored in a computer-readable medium, such as memory 1120. A computer-readable medium may be defined as a non-transitory memory device. A memory device may include space within a single physical memory device or spread across multiple physical memory devices. The software instructions may be read into memory 1120 from another computer-readable medium or from another device. The software instructions stored in memory 1120 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 6 and 7, the order of the blocks may be modified in other implementations. Further, non-dependent blocks may be performed in parallel.

Additionally, while examples of data structures are illustrated in FIG. 5 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A mobile device comprising processing circuitry to:
   receive user preference information indicating a plurality of local storage limits for a plurality of content types,
      wherein a particular local storage limit, of the plurality of local storage limits, is a local storage limit for a particular content type, of the plurality of content types, and
      wherein the user preference information is obtained via a graphical interface, provided by the mobile device, to the user, for inputting the plurality of local storage limits for the plurality of content types;
   receive a request to store a particular content item, the particular content item being associated with a particular content type of the plurality of content types;
   determine a total local storage amount for a plurality of content items that are stored locally on the mobile device and that are associated with the particular content type, the plurality of the content items being associated with a plurality of different applications;
   determine, based on a local storage limit for the particular content type and based on the determined total local storage amount, whether local storage of the particular content item would exceed the local storage limit for the particular content type;
   select, when the local storage of the particular content item is determined to exceed the local storage limit for the particular content type, one or more of the plurality of the content items to move to a remote storage server; and
   move the selected one or more of the plurality of the content items to the remote storage server.

2. The mobile device of claim 1, wherein the selection of the one or more of the plurality of the content items includes preferentially selecting content items that have not been recently accessed.

3. The mobile device of claim 1, wherein the selection of one or more of the plurality of the content items includes selecting the one or more of the plurality of the content items based on a determination of which of the one or more of the plurality of the content items is least likely to be subsequently read.

4. The mobile device of claim 1, wherein the request to store the particular content item includes an explicit indication of the content type of the particular content item.

5. The mobile device of claim 1, wherein moving the selected one or more of the plurality of the content items to the remote storage server includes transmitting the selected one or more of the plurality of the content items, via a cellular wireless network, during periods of low load of a radio interface of the cellular wireless network.

6. The mobile device of claim 1, wherein the request to store the content item is received by an Operating System (OS) layer component of the mobile device.

7. The mobile device of claim 1, wherein the plurality of content types include: an audio content type, a photo content type, and a video content type.

8. A method implemented by a mobile device, the method comprising:
   receiving, by the mobile device, user preference information indicating a plurality of local storage limits for a plurality of content types, wherein a particular local storage limit, of the plurality of local storage limits, is a local storage limit for a particular content type, of the plurality of content types, and wherein the user preference information is obtained via a graphical interface, provided by the mobile device, to the user, for inputting the plurality of local storage limits for the plurality of content types;

receiving, from an application being executed by the mobile device, a request to store a particular content item, the particular content item being associated with a particular content type of the plurality of content types;

determining, by the mobile device, a total local storage amount for a plurality of content items that are stored locally on the mobile device and that are associated with the particular content type, the plurality of content items being associated with a plurality of different applications;

determining, by the mobile device, and based on a local storage limit for the particular content type and based on the determined total local storage amount, whether local storage of the particular content item would exceed the local storage limit for the particular content type;

selecting, by the mobile device and when the local storage of the particular content item is determined to exceed the local storage limit for the particular content type, one or more of the plurality of the content items to move to a remote storage server; and moving, by the mobile device, the selected one or more of the plurality of the content items to the remote storage server.

9. The method of claim 8, wherein the selecting the one or more of the plurality of the content items includes preferentially selecting content items that have not been recently accessed.

10. The method of claim 8, wherein the selecting the one or more of the plurality of the content items includes selecting the one or more of the plurality of the content items based on a determination of which of the one or more of the plurality of the content items is least likely to be subsequently read.

11. The method of claim 8, wherein the request to store the particular content item includes an indication of the content type of the particular content item.

12. The method of claim 8, wherein moving the selected one or more of the plurality of the content items to the remote storage server includes transmitting the selected one or more of the plurality of the content items, via a cellular wireless network, during periods of low load of a radio interface of the cellular wireless network.

13. The method of claim 8, wherein the request to store the content item is received by an Operating System (OS) layer component of the mobile device.

14. The method of claim 8, wherein the plurality of content types include at least one of: an audio content type, a photo content type, or a video content type.

15. The method of claim 8, further comprising:

receiving a second request, from the application being executed by the mobile device, to read a second particular content item;

determining whether the second particular content item is stored locally or at the remote storage server;

reading the second particular content item, from local storage, when the second particular content item is determined to be stored locally; and reading the second particular content item, from remote storage server, when the particular content item is determined to not be stored locally but to be stored at the remote storage server.

16. A mobile device comprising processing circuitry to:

receive user preference information, from the user of the mobile device, indicating storage limits, each of the storage limits being applicable to an aggregate amount of data, of a particular content type, and each of the storage limits being associated with a plurality of applications executed by the mobile device, and wherein the user preference information is obtained via a graphical interface, provided by the mobile device, to the user, for inputting the plurality of local storage limits for the plurality of content types;

schedule a transfer of data, of the particular content type, between local storage of the mobile device and cloud storage implemented remotely relative to the mobile device, the scheduling being based on the user preference information and based on the aggregate amount of data of the particular content type; and transfer the scheduled data, to and from the cloud storage, to enforce the storage limits indicated by the user preference information.

17. The mobile device of claim 16, wherein scheduling the transfer of data includes scheduling the transfer of the data during periods of low network load.

18. The mobile device of claim 16, wherein the processing circuitry is further to:

allocate storage of all data of the particular content type, between the local storage and the cloud storage, the allocation including preferentially store recently accessed data locally.

19. The mobile device of claim 16, wherein the processing circuitry is further to:

allocate storage of all data of the particular content type, between the local storage and the cloud storage, the allocation being based on one or more of: file size of content items; total storage space of the mobile device; last access of content items of a particular content type; last access by a particular application that created a particular content item; and known upcoming user events.

20. The mobile device of claim 16, wherein the particular content type includes one of: an audio content type, a photo content type, or a video content type.

* * * * *